(12) United States Patent
Van Gaasbeck (10) Patent No.: US 10,599,342 B2
(45) Date of Patent: Mar. 24, 2020

(54) METHOD AND SYSTEM FOR OFFSET MIRRORING IN A STORAGE SYSTEM

(71) Applicant: EMC IP Holding Company LLC, Hopkinton, MA (US)

(72) Inventor: Richard H. Van Gaasbeck, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 227 days.

(21) Appl. No.: 15/395,441

(22) Filed: Dec. 30, 2016

(65) Prior Publication Data

US 2018/0188982 A1 Jul. 5, 2018

(51) Int. Cl.
*G06F 3/06* (2006.01)
*G06F 12/02* (2006.01)

(52) U.S. Cl.
CPC ............ *G06F 3/0619* (2013.01); *G06F 3/064* (2013.01); *G06F 3/0635* (2013.01); *G06F 3/0665* (2013.01); *G06F 3/0688* (2013.01); *G06F 12/0238* (2013.01); *G06F 2212/1036* (2013.01); *G06F 2212/7208* (2013.01); *G06F 2212/7211* (2013.01)

(58) Field of Classification Search
CPC .......................... G06F 3/065; G06F 2212/7211
See application file for complete search history.

(56) References Cited

U.S. PATENT DOCUMENTS

| | | | |
|---|---|---|---|
| 8,041,884 B2 | 10/2011 | Chang | |
| 8,700,840 B2 | 4/2014 | Paley et al. | |
| 8,825,938 B1* | 9/2014 | Ellard | G06F 12/0246 711/103 |
| 8,891,303 B1 | 11/2014 | Higgins et al. | |
| 2007/0294490 A1* | 12/2007 | Freitas | G06F 12/0246 711/154 |
| 2009/0168505 A1 | 7/2009 | Hanzawa et al. | |
| 2010/0172180 A1 | 7/2010 | Paley et al. | |
| 2011/0299317 A1 | 12/2011 | Shaeffer et al. | |
| 2014/0089565 A1* | 3/2014 | Lee | G06F 3/061 711/103 |
| 2014/0219034 A1 | 8/2014 | Gomez et al. | |
| 2014/0226413 A1 | 8/2014 | Gomez et al. | |
| 2014/0369124 A1 | 12/2014 | Moon et al. | |
| 2015/0221358 A1 | 8/2015 | Brandl | |
| 2016/0027481 A1 | 1/2016 | Hong | |
| 2016/0148700 A1 | 5/2016 | Oh | |

* cited by examiner

*Primary Examiner* — Edward J Dudek, Jr.
*Assistant Examiner* — Andrew Russell
(74) *Attorney, Agent, or Firm* — Chamberlin, Hdrlicka, White, Williams & Aughtry (57) ABSTRACT

In general, embodiments of the technology relate to a method for storing data. The method includes receiving a request to write data. In response to the request, the method further includes, selecting a first physical address in a first region in a first storage module, selecting a second physical address in a second region in a second storage module, where an amount of wear associated with the first physical address is different than an amount of wear associated with the second physical address, writing a first copy of the data to the first physical address, and writing a second copy of the data to the second physical address.

20 Claims, 11 Drawing Sheets

METHOD AND SYSTEM FOR OFFSET MIRRORING IN A STORAGE SYSTEM

BACKGROUND

In order to protect against potential loss of data in a storage system, it is often advantageous to implement a replication scheme. Current replication schemes are only able to sustain a limited amount of error before data within the storage system is unable to be read.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1-5B, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to storing data in a storage array using a mirroring scheme. More specifically, the mirroring scheme uses information about the current amount of wear of the various storage modules in order to select physical locations on the individual storage modules in which to store data.

Figure 1:
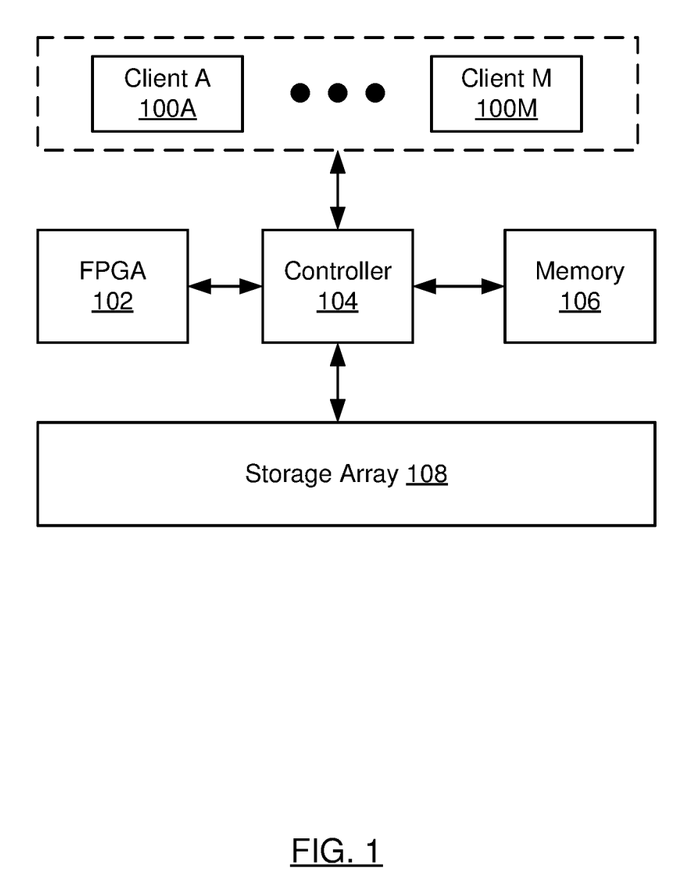
FIG. 1 shows a system in accordance with one embodiment of the technology.

FIG. 1 shows a system in accordance with one embodiment of the technology. As shown in FIG. 1, the system includes one or more clients (100A, 100M), a Controller (104), memory (106), optionally a Field Programmable Gate Array (FPGA) (102), and a storage array (108). Each of these components is described below.

In one embodiment of the technology, a client (100A, 100M) is any system or process executing on a system that includes functionality to issue a read request or a write request to the Controller (104). In one embodiment of the technology, the clients (100A, 100M) may each include a processor (not shown), memory (not shown), and persistent storage (not shown). In one embodiment of the technology, the Controller (104) is configured to implement a mirroring scheme, which includes writing data to the storage array (108) in a manner consistent with embodiments described in FIGS. 2-4E. Further, the Controller includes functionality to read data (including reconstructing data) from the storage array (108). In one embodiment of the technology, the Controller (104) includes a processor configured to execute instructions to implement one or more embodiments of the technology, where the instructions are stored on a non-transitory computer readable medium (not shown) that is located within or that is operatively connected to the Controller (104). Alternatively, the Controller (104) may be implemented using hardware. Those skilled in the art will appreciate that the Controller (104) may be implemented using any combination of software and/or hardware without departing from the technology.

In one embodiment of the technology, the Controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the technology, the memory (106) is configured to temporarily store various data prior to such data being stored in the storage array.

In one embodiment of the technology, the FPGA (102) (if present) may be used to offload all or a portion of the functionality of the controller (104) in accordance with one or more embodiments of the technology.

In one embodiment of the technology, the storage array (108) includes one or more storage modules (SMs). In one embodiment of the technology, one or more of the storage modules in the storage array include solid-state memory. The solid-state memory may include, but is not limited to, write in-place persistent memory, Spin-Torque Magnetic RAM (ST-MRAM), Phase Change Memory (PCM), NAND Flash memory and NOR Flash memory. Further, the NAND Flash memory and the NOR flash memory may include single-level cells (SLCs), multi-level cell (MLCs), or triple-level cells (TLCs). Generally, the solid-state memory may correspond to any type of memory that has a finite number of program-erase cycles. Those skilled in the art will appreciate that the technology is not limited to the solid-state memory; rather, embodiments of the technology may be implemented using any type of persistent storage.

Those skilled in the art will appreciate that while FIG. 1 shows an FPGA, the technology may be implemented without an FPGA. Further, those skilled in the art will appreciate that other components may be used in place of the FPGA without departing from the technology. For example, the technology may be implemented using an Application Specific Integrated Circuit(s) (ASIC), a graphics processing unit(s) (GPU), a general purpose processor(s), any other hardware device capable of offloading all or a portion of the processing performed by the controller.

Those skilled in the art will appreciate that the technology is not limited to the configuration shown in FIG. 1.

Figure 2:
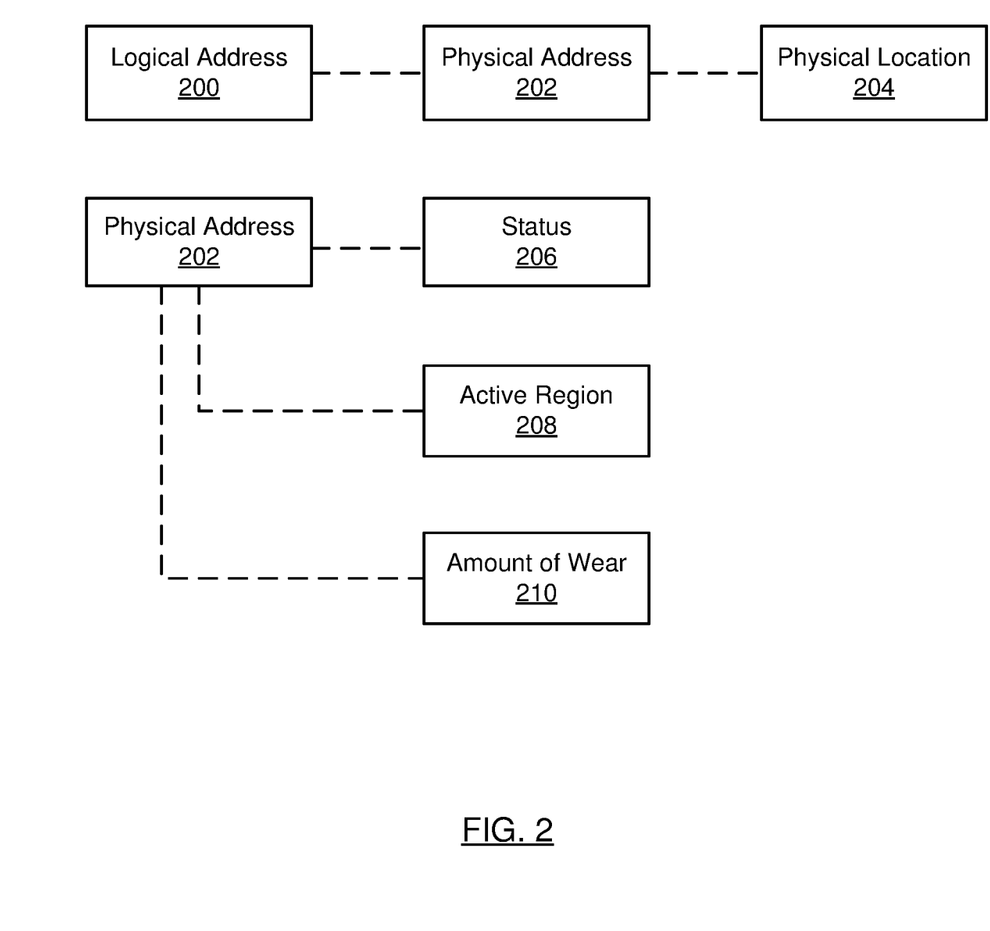
FIG. 2 shows data structures in accordance with one embodiment of the technology.

FIG. 2 shows the relationship between the various components in the system. In one embodiment of the technology, the Controller (104) may maintain data structures to track one or more of the relationships below.

In one or more embodiments of the technology, each physical location (204) in the storage array is associated with a logical address (200) and a physical address (202). Further, for each physical address (202), the Controller may track the following information: (i) status (206), which indicates whether the block is a free block or an occupied block; (ii) active region (208), i.e., whether the physical location is part of an active region (see e.g., FIGS. 3A-4E); (iii) the current amount of wear of the physical location (204). Further, the Controller may also track the active regions for each of the storage modules on a per-storage module basis (see e.g., FIGS. 4A-4E). In one embodiment of the technology, amount of wear may be the same as or a function of the number of program/erase (P/E) cycles that have been performed on the particular physical location. In such cases, the Controller may track the P/E cycles (e.g., tracked as P/E cycle value) for each of the physical locations in the storage array and then calculate the amount of wear (210) for each of the physical locations using this information.

The P/E cycle value may represent: (i) the number of P/E cycles that have been performed on the physical location defined by the physical address or (ii) a P/E cycle range (e.g., 5,000-9,999 P/E cycles), where the number of P/E cycles that have been performed on the physical location (204) defined by the physical address (202) is within the P/E cycle range. In one embodiment of the technology, a P/E cycle is the writing of data to one or more pages in an erase block (i.e., the smallest addressable unit for erase operations, typically, a set of multiple pages) and the erasure of that block, in either order. In one embodiment of the technology, the physical location (204) corresponds to page. The P/E cycle values may be stored per physical location, per set of physical locations, or and/or at any other level of granularity. The Controller includes functionality to update, as appropriate, the P/E cycle values and the wear level when data is written to (and/or erased from) physical locations in the storage array. See e.g., FIG. 3A, Step 310.

Figure 3A:
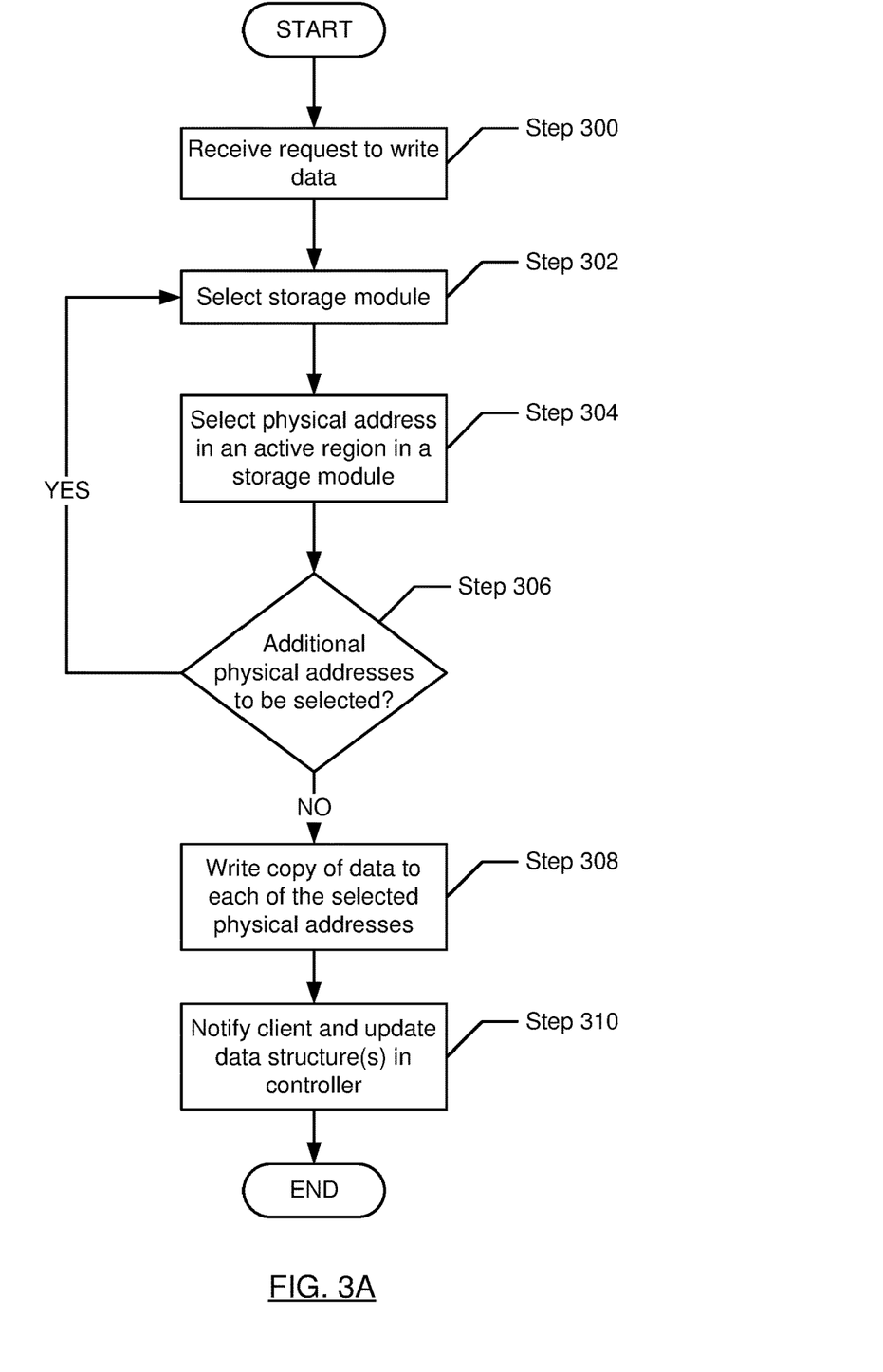
FIG. 3A shows a flowchart for servicing write requests in accordance with one or more embodiments of the technology.
Figure 3B:
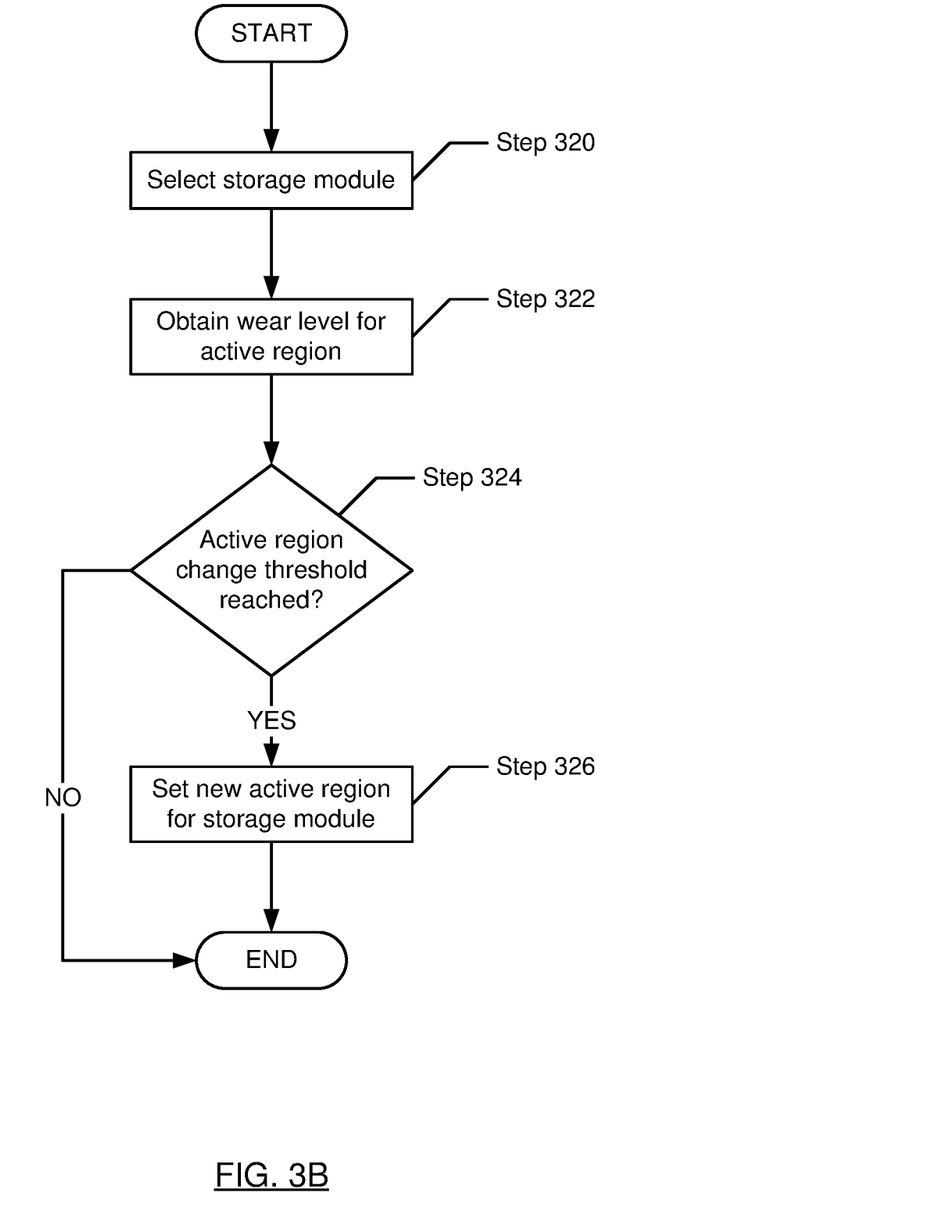
FIG. 3B shows a flowchart for updating the active region in a storage module in accordance with one or more embodiments of the technology.

FIGS. 3A-3B show flowcharts in accordance with one or more embodiments of the technology. More specifically, FIGS. 3A-3B show a method for storing data in a storage array in accordance with one or more embodiments of the technology. While the various steps in the flowchart are presented and described sequentially, one of ordinary skill will appreciate that some or all of the steps may be executed in different orders, may be combined or omitted, and some or all of the steps may be executed in parallel. In one embodiment of the technology, the methods shown in FIGS. 3A-3B may be performed in parallel.

FIG. 3A shows a flowchart for servicing a write request in accordance with one or more embodiments of the technology. In Step 300, a request to write data is received from a client. The request may include information which specifies the type of mirroring to use to store the data (also referred to as replication level). For example, the request may specify that the data is to be written using a three-way mirroring scheme. Alternatively, the request may not specify any such information regarding the mirroring scheme and, instead, the controller may be configured to implement a specific type of mirroring scheme. The configuration of the mirroring scheme that is used to store the data may vary over time. Further, storage array may concurrently store data with different levels of replication. For example, some data may be stored using three-way mirroring while other data may be stored using two-way mirroring.

Steps 302-306 describe an embodiment of the technology in which the controller selects where to write the various copies of the data. The number of times steps 302-306 are performed may be based on the number of copies of data to be stored. For example, if the data is to be stored using a three-way mirroring scheme, then steps 302-306 may each be performed three times.

Continuing with the discussion of FIG. 3A, in step 302, the Controller selects a storage module. The storage module may correspond to any storage module that includes an active region, where the storage module has not been previously selected to service write request (i.e., the write request received in step 300).

In step 304, a physical address in an active region of the selected storage module is selected. In one embodiment of the technology, the controller may track which physical addresses are part of an active region of each storage module. As discussed below, when the active region of a given storage module changes (see e.g., FIG. 3B), the controller may update one or more data structures to reflect which physical addresses are associated with the now active region of the storage module. In one embodiment of the technology, the selected physical address is a physical address in the active region with a status (206) of free (i.e., data may be written to this physical address).

In step 306, a determination is made about whether additional physical addresses need to be selected to service the write request. If additional physical addresses need to be selected, then process proceeds to step 302; otherwise, the process proceeds to step 308. For example, if one physical address on one storage module has been selected but the data is to be written to three physical locations, the process proceeds to step 302 in order for additional physical addresses to be selected.

Continuing with the discussion of FIG. 3A, in step 308, the Controller issues one or more write requests to the storage array and/or the individual storage modules in order to write the copies of the data to the selected physical addresses. For example, if the data is to be written to the storage array using a three-way mirroring scheme, a copy of the data is written to three different storage modules in accordance with the selections performed in steps 302-306.

In step 310, the Controller notifies the client of a successful write operation and updates one or more data structures to reflect the state of the storage array following the successful write operation. For example, the controller may update the wear level and status associated with one or more physical locations.

In one or more embodiments, the Controller may proactively perform, e.g., steps 302-306. For example, consider a scenario in which the controller is configured to store data in the storage array using three-way mirroring, the controller may select sets of physical locations, where each set of physical locations includes three physical addresses each in an active region on a different storage module. In such scenarios, when the controller receives a write request (see e.g., step 300), the Controller may randomly select one of the pre-determined sets of physical locations to service the write request.

FIG. 3B shows a flowchart for updating the active region in a storage module in accordance with one or more embodiments of the technology.

In Step 320, storage module is selected.

In Step 322, the amount of wear of the active region is obtained. In one embodiment, the controller maintains a data structure (see e.g., FIG. 2) that tracks the average amount of wear for all physical addresses in the active region of each of the storage modules in the system. The amount of wear of the active region may correspond to the average amount of wear of all physical addresses in the active region of the selected storage module, the median amount of wear of all physical addresses in the active region of the selected storage module, or a value that is a function of the amount of wear of some or all of the physical addresses in the active region of the selected storage module.

In Step 324, a determination is made about whether a change threshold for the active region for the selected storage module has been reached based on the amount of wear obtained in step 322. The change threshold may be expressed as an amount of wear or may be expressed as another value. Further, the determination may be made by comparing the amount of wear obtained in step 322 to a change threshold. Alternatively, the determination may be made by comparing a value derived from an amount of wear obtained in step 322 to a change threshold. If the change threshold is reached, the process proceeds to step 326; otherwise the process ends.

In one embodiment of the technology, the change thresholds are set for one or more storage modules such that the active regions within the storage modules are offset or will become offset (i.e., will have different values). The controller may implement any change threshold scheme in order to achieve a storage array in which there are different storage modules that include different amounts of wear. One example of change thresholds that may be used to achieve the aforementioned results is shown in FIGS. 4A-4E. Said another way, the change thresholds for the various storage modules within the storage array may be different and/or may change over time. The change thresholds may also vary based on the replication level of the data stored in the storage array. For example, the change thresholds may be different when the controller is implementing three-way mirroring versus two-way mirroring.

In Step 326, a new active region is set for the storage module. In one embodiment of technology, the selection of the active region for a given storage module is determined based, at least in part, on the amount of wear of the other storage modules that are used to store the data. See e.g., FIGS. 4A-4E. In one embodiment, the region selected in step 326 may have been previously been an active region for the storage module. For example, at a first time, a first region on an SM is set as the active region, at a second time a second region on the SM is set as the active region, and at third time the first region is set as the active region.

The process depicted in FIG. 3B may be initiated at any time by the Controller. For example, the method shown in FIG. 3B may be performed after a predetermined period, when a storage module is replaced, when a certain number of P/E cycles has been performed on the persistent storage, etc. Further, the process may also be initiated by an administrator or another third party. In one embodiment of the technology, the frequency at which the method shown in FIG. 3B is performed may be determined, at least in part, by the load on the Controller (e.g., the method shown in FIG. 3B may be initiated more frequently when there is a higher volume write requests).

FIGS. 4A-4E show an example in accordance with one or more embodiments of the technology. Those skilled in the art will appreciate that the technology is not limited to the example shown in FIGS. 4A-4E.

Consider a scenario in which the controller is implementing three-way mirroring in accordance with one or more embodiments of the technology. Further, for purposes of this example, assume that each storage module includes three regions. Those skilled in the art will appreciated that the controller may logically divide each of the storage modules into one or more regions. Further, each of the storage modules may include a different number of regions without departing from the technology.

Figure 4A:
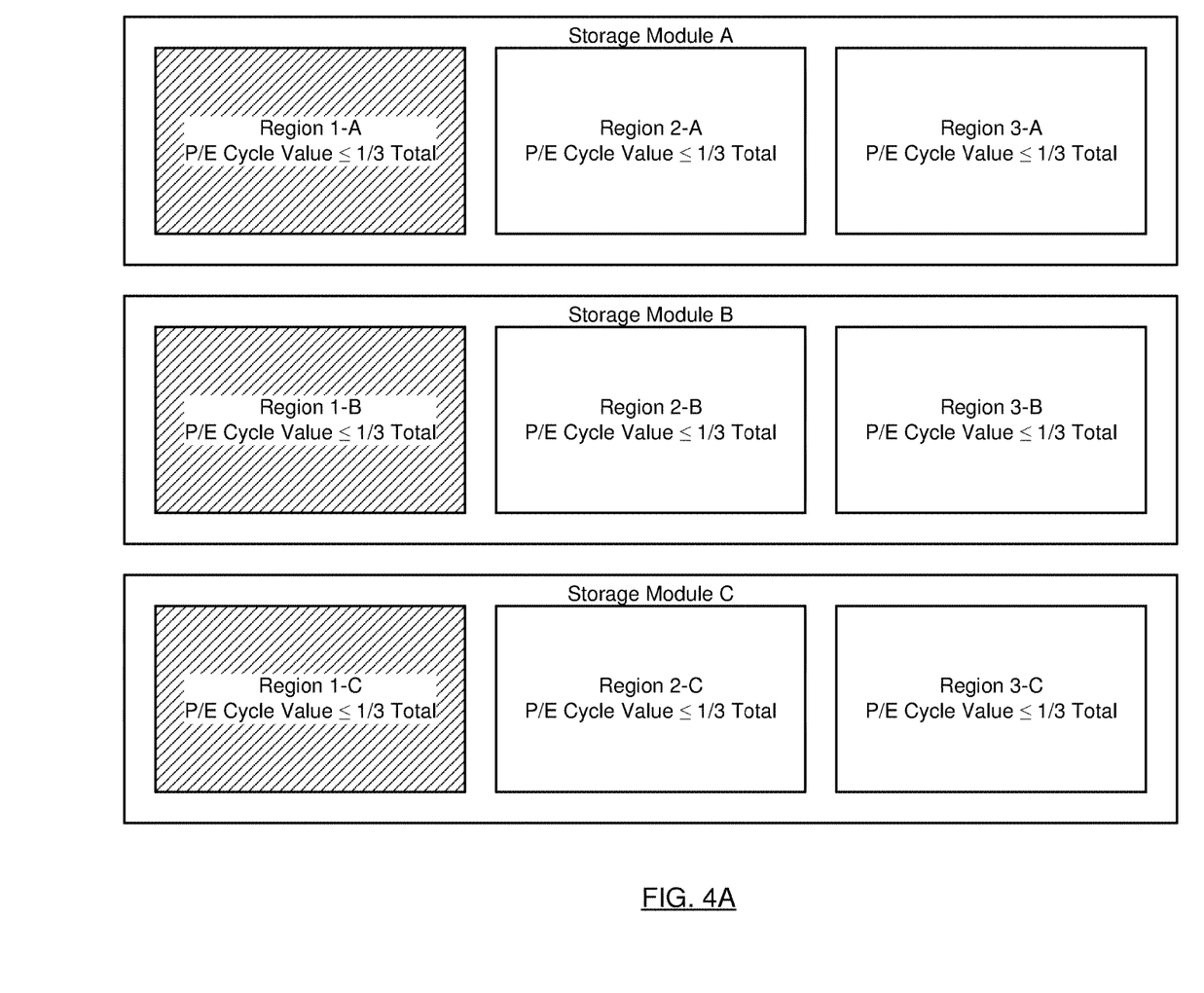
FIGS. 4A-4E show an example in accordance with one or more embodiments of the technology.

Referring to FIG. 4A, initially, there is no data written to any of the storage modules (storage module A, storage module B, storage module C). Accordingly, the controller may select any of the three regions on each of the storage modules to be the active region. In this scenario, the control selects the following three regions as active regions: Region 1-A, Region 1-B, Region 1-C. Further, controller sets the change threshold for Region 1-A to P/E cycle value=⅓ total P/E cycle value (i.e., the maximum P/E cycle value for the storage media in the storage module, denoted as "Total")). The controller sets the change threshold for Region 1-B to P/E cycle value=⅔ Total. Finally, the controller sets the change threshold for Region 1-C to P/E cycle value=Total.

The controller may subsequently service write requests for the clients. For each such write request, one copy of the data is written to a physical address in Region 1-A, to physical address in Region 1-B, and to a physical address in Region 1-C. The skilled in the art will appreciate that the controller may implement a wear leveling scheme such that all physical addresses within a given active regions are evenly or substantially evenly worn. The result of the wear leveling within each of the active regions results in physical addresses within an active region all having the same or substantially the same (or similar) wear level (as determined by the wear leveling scheme). Further, by implementing method shown in FIGS. 3A and 3B, the amount of wear between the active regions is different (i.e., the difference in the amount of wear between the physical locations within an active region is less than the difference in the amount of wear between the physical locations in different active regions).

Continuing with the discussion of the example, at some point in time, the method shown in FIG. 3B is performed for each of the storage modules. The method may be performed serially or in parallel for each of the storage modules. When the method is performed, the amount of wear for Region 1-A, Region 1-B, Region 1-C are all ⅓ Total. Based on the previously set change thresholds for each of the active regions, only the change threshold for Region 1-A is reached. Based on this determination, the active region for storage module A is set to Region 2-A. Further, the change threshold for Region 2-A is set to P/E cycle value=Total.

Figure 4B:
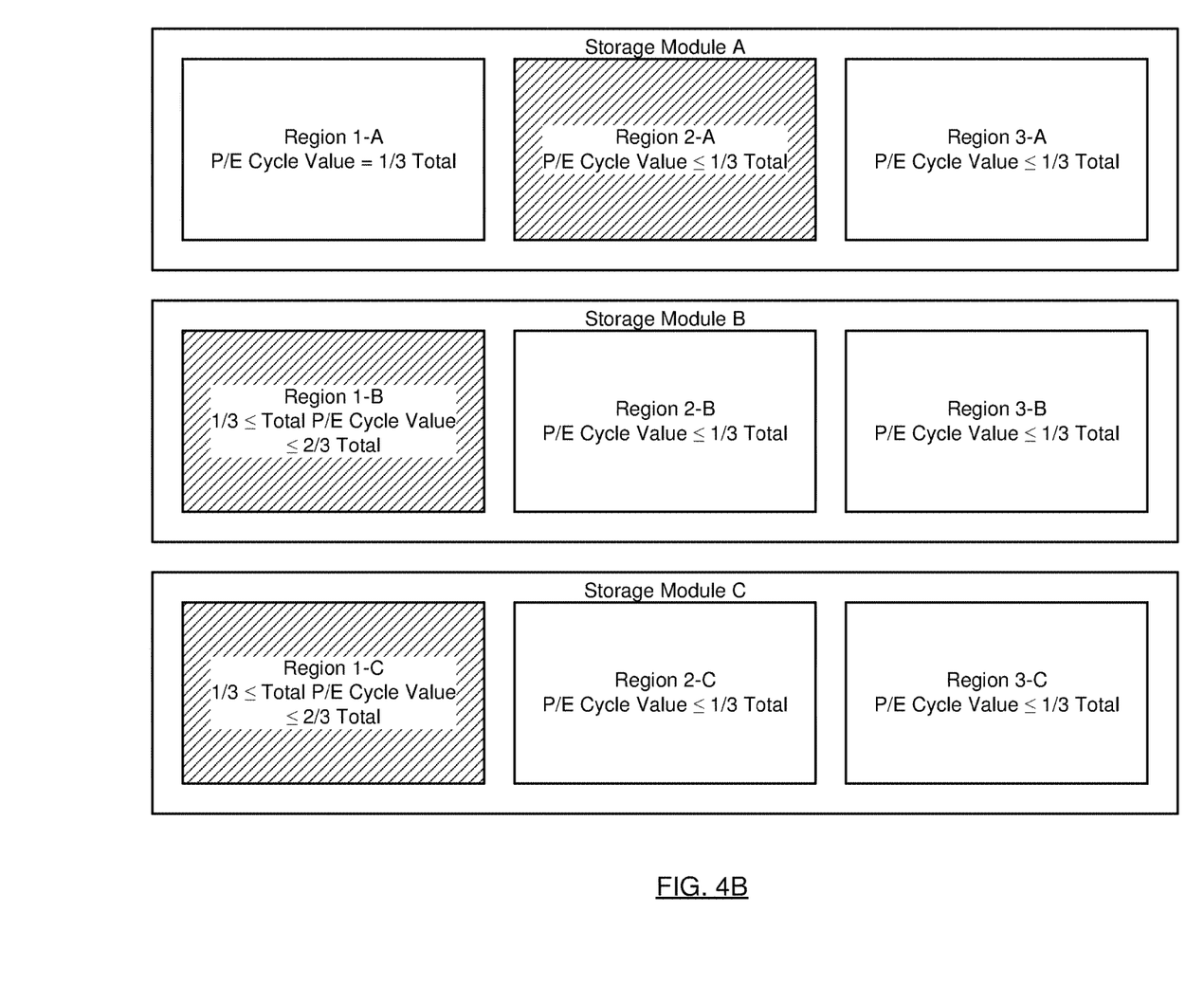

Referring to FIG. 4B, the controller may subsequently service write requests for the clients. For each such write request, one copy of the data is written to a physical address in Region 2-A, to physical address in Region 1-B, and to a physical address in Region 1-C.

At some point in time, the method shown in FIG. 3B is performed for each of the storage modules. The method may be performed serially or in parallel for each of the storage modules. When the method is performed, the amount of wear for Region 2-A=⅓ Total, Region 1-B=⅔ Total, Region 1-C=⅔ Total. Based on the previously set change thresholds for each of the active regions, only the change threshold for Region 1-B is reached. Based on this determination, the active region for storage module B is set to Region 2-B. Further, the change threshold for Region 2-B is set to P/E cycle value=Total.

Figure 4C:
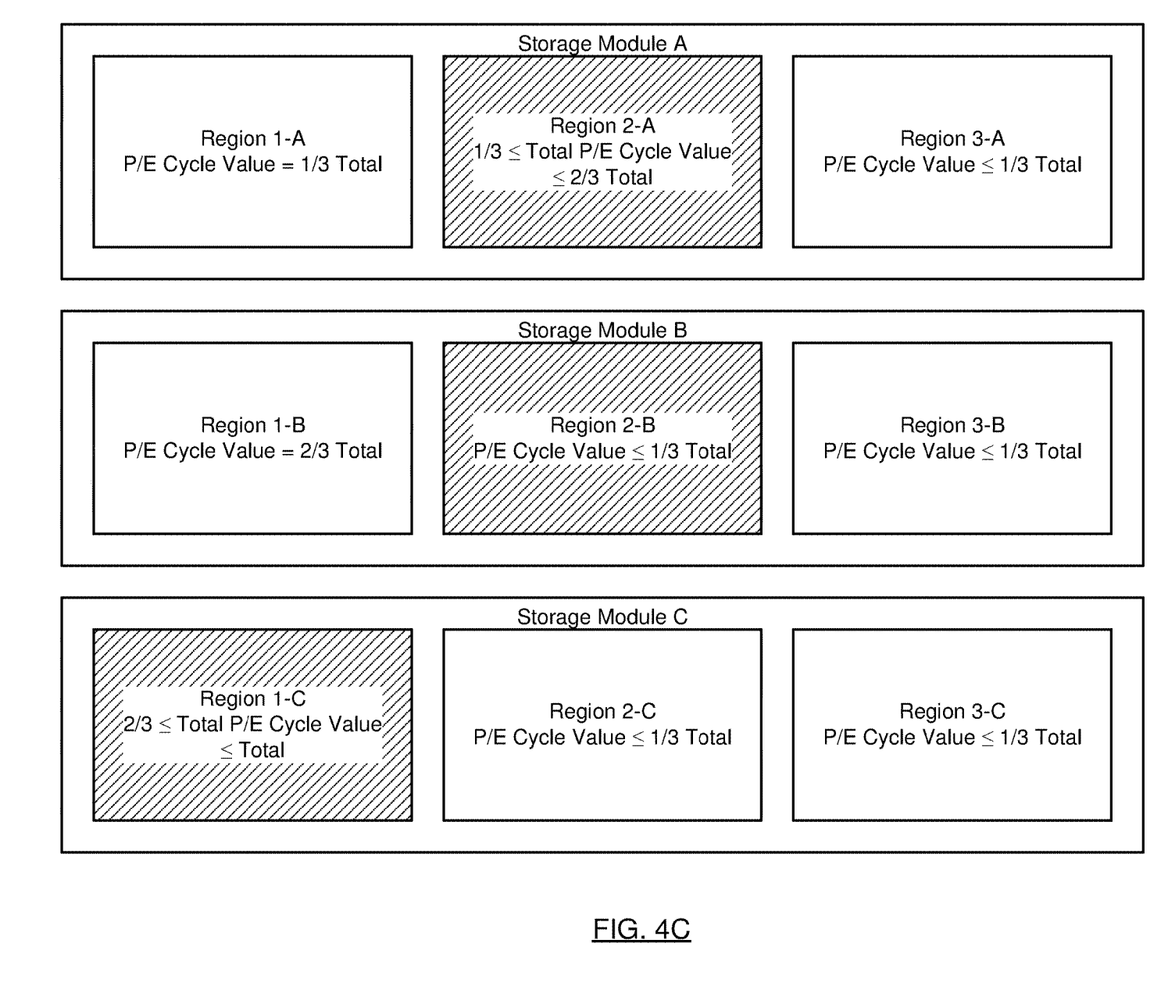

Referring to FIG. 4C, the controller may subsequently service write requests for the clients. For each such write request, one copy of the data is written to a physical address in Region 2-A, to physical address in Region 2-B, and to a physical address in Region 1-C.

At some point in time, the method shown in FIG. 3B is performed for each of the storage modules. The method may be performed serially or in parallel for each of the storage modules. When the method is performed, the amount of wear for Region 2-A=⅔ Total, Region 2-B=⅓ Total, Region 1-C=Total. Based on the previously set change thresholds for each of the regions, only the change threshold for Region 1-C is reached. Based on this determination, the active region for storage module C is set to Region 2-C. Further, the change threshold for Region 2-C is set to P/E cycle value=Total.

Figure 4D:
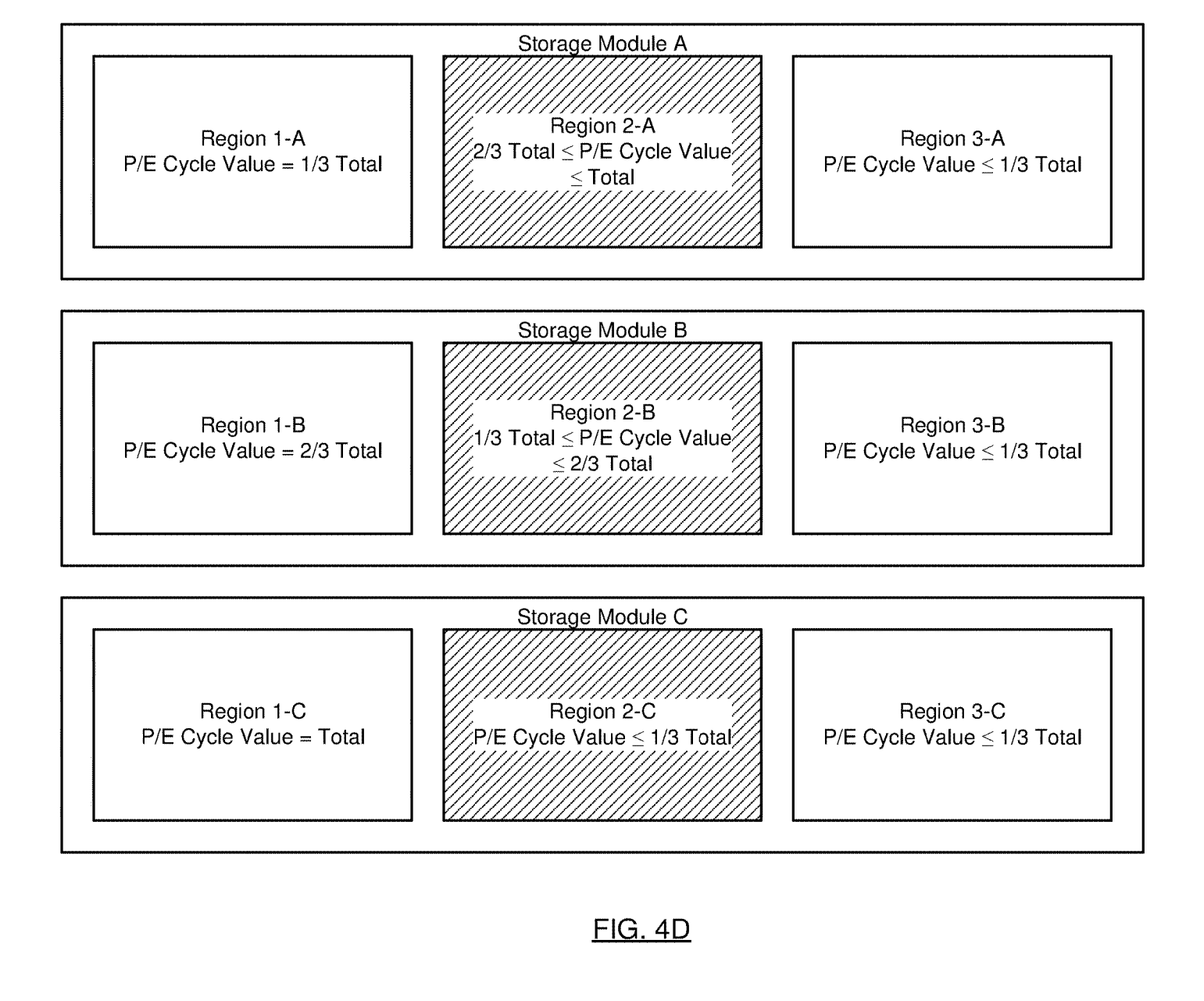

Referring to FIG. 4D, the controller may subsequently service write requests for the clients. For each such write request, one copy of the data is written to a physical address in Region 2-A, to physical address in Region 2-B, and to a physical address in Region 2-C.

At some point in time, the method shown in FIG. 3B is performed for each of the storage modules. The method may be performed serially or in parallel for each of the storage modules. When the method is performed, the amount of wear for Region 2-A=Total, Region 2-B=⅔ Total, Region 2-C=⅓ Total. Based on the previously set change thresholds for each of the regions, only the change threshold for Region 2-A is reached. Based on this determination, the active region for storage module A is set to Region 3-A. Further, the change threshold for Region 3-A is set to P/E cycle value=Total.

Figure 4E:
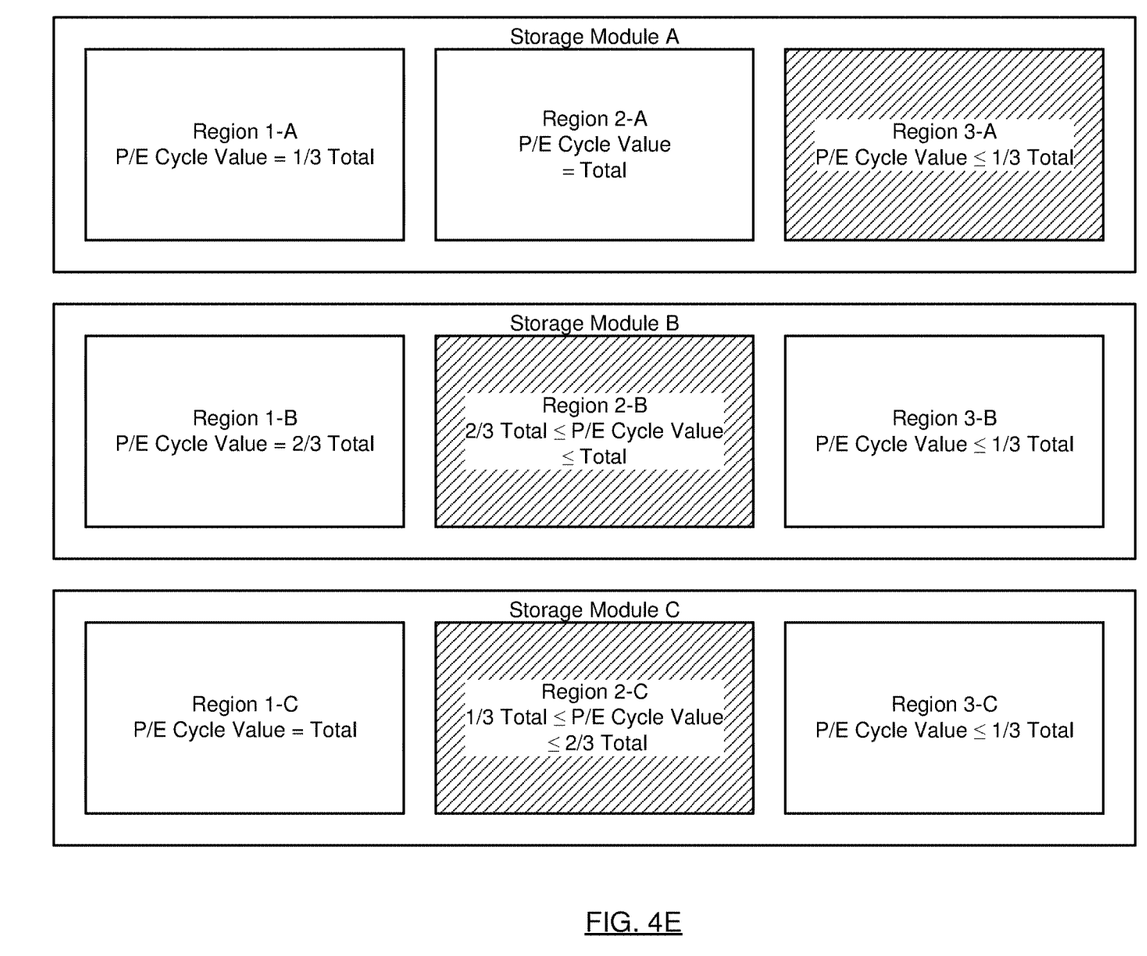

Referring to FIG. 4E, the controller may subsequently service write requests for the clients. For each such write request, one copy of the data is written to a physical address in Region 3-A, to physical address in Region 2-B, and to a physical address in Region 2-C.

Figure 5A:
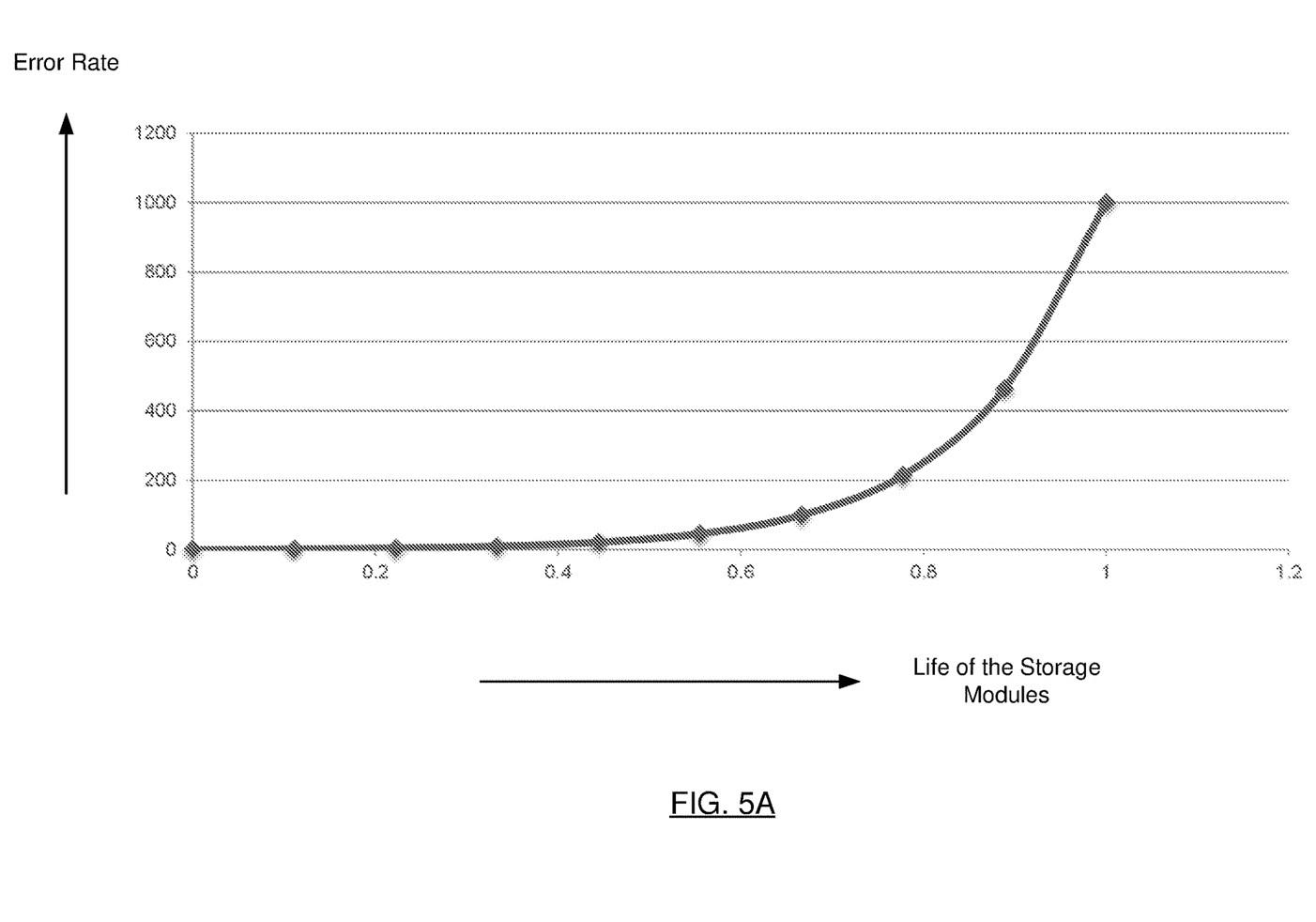
FIGS. 5A-5B show an example in accordance with one or more embodiments of the technology.
Figure 5B:
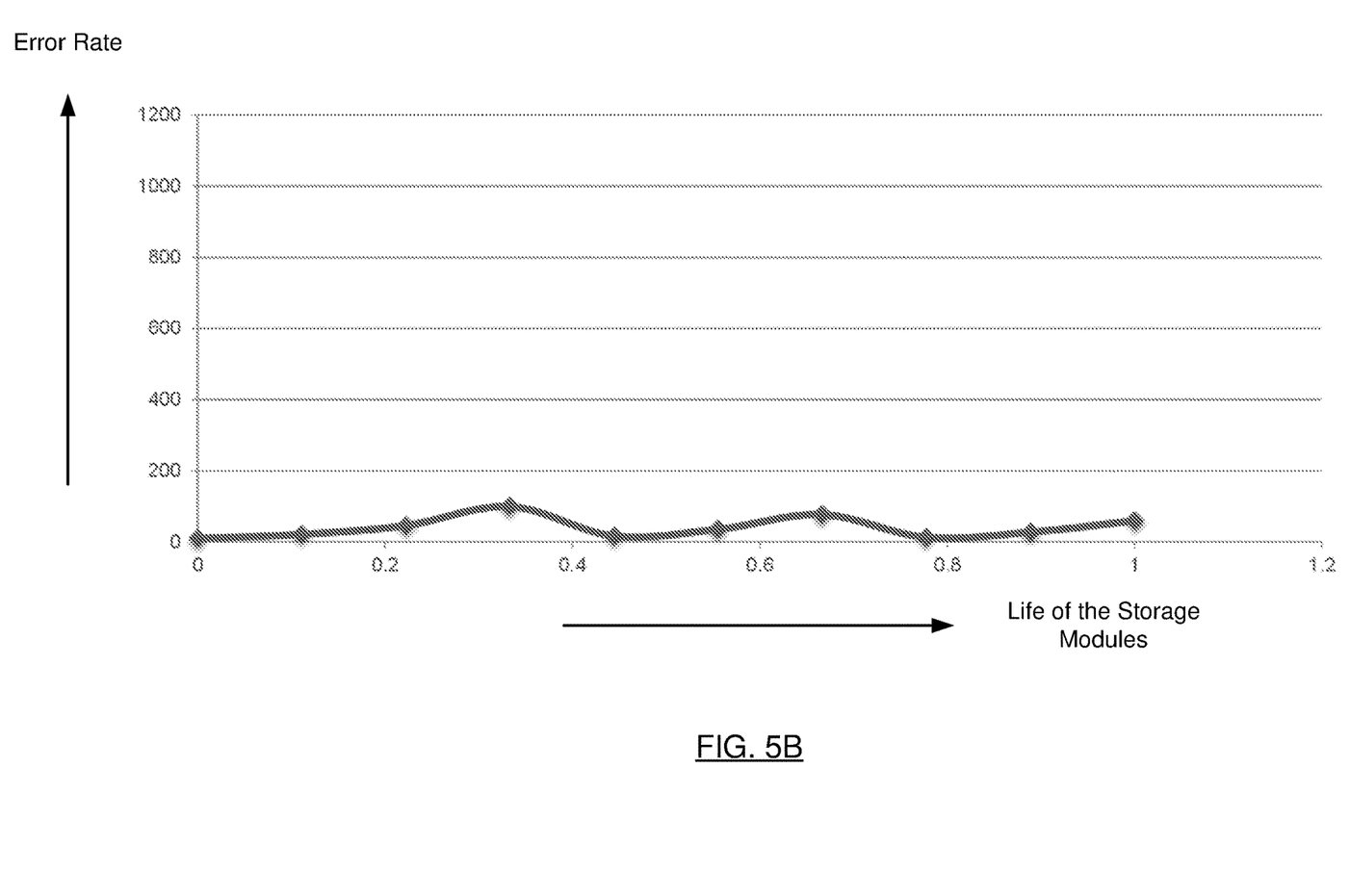

Advantageously, systems and methods implementing one or more embodiments of the technology may exhibit failure rate improvements as shown in FIGS. 5A and 5B by, for example, a factor of ten. For example, referring to FIG. 5A, FIG. 5A shows a three-way mirroring scheme in which there is no offset mirroring. More specifically, when the copy of data is written to each of three storage devices, the physical locations across in which each of the copy data is stored has the same wear level. Over time, the copies of data are written to physical locations that all have significant wear resulting in an exponential increase in read errors Referring to FIG. 5B, the FIG. 5B shows a three-way mirroring scheme in which there is offset mirroring (i.e., the mirroring scheme is implemented in accordance with one or more embodiments of the technology). More specifically, when the copy of data is written to each of three storage devices, the physical locations across in which each of the copy data is stored has a low or different wear level. Over time, the copies of data are written to physical locations that all have different wear levels resulting in a relatively low and consistent level of read errors.

The exponential increase in error (e.g., unrecoverable bit error rate (UBER)) as shown in FIG. 5A is the result of three storage devices all having the same bit error rate, which increases over time. For example, if the UBER is 10× greater for storage devices at their end of life as compared to the beginning of their life, then the probability of no errors on three of the storage devices at the beginning of their life is $P^3$. However, at the end of their life, the probability of no errors on three of the storage devices at the beginning of their life is $(0.1P)^3=(1/1000)P^3$.

By contrast, as shown in FIG. 5B, the error rate using embodiments of the technology is relatively low across the three storage devices because at any point in time, only one of the three copies of data that is being written as part of the three-way mirroring scheme, is being written to an active region that is near its EOL (i.e., has the highest BER). The remaining two copies of the data are being written to other active regions in other storage modules that have lower (or substantially lower) BERs. Accordingly, the overall BER for the three copies of data written as part of the three-way mirroring scheme using embodiments of the technology is less (or substantially less) than the overall BER of the three copies of data written as part of the three-way mirroring scheme not using embodiments of the technology.

One or more embodiments of the technology may be implemented using instructions executed by one or more processors in the system. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data comprising:
receiving a request to write data;
in response to the request, mirroring the data to storage modules having mirrored write operations restricted to active regions by:
selecting a first physical address in a first active region in a first storage module of the storage modules, wherein the first active region comprises an address range less than a total address range of the first storage module;
selecting a second physical address in a second active region in a second storage module of the storage modules, wherein the second active region comprises an address range less than a total address range of the second storage module, wherein an amount of wear associated with the first active region is less than a first change threshold and an amount of wear associated with the second active region is greater than the first change threshold;
writing a first copy of the data to the first physical address; and
writing a second copy of the data to the second physical address,
wherein the first storage module and the second storage modules are solid state modules.

2. The method of claim 1, further comprising:
modifying the address range of the first active region to include a new address range that is different from the address range to obtain an updated first active region;
after obtaining the updated first active region:
receiving a second request to write second data;
in response to the second request:
selecting a third physical address in the updated first active region;
selecting a fourth physical address in the second active region;
writing a first copy of the second data to the third physical address; and
writing a second copy of the second data to the fourth physical address.

3. The method of claim 2, further comprising:
obtaining an amount of wear of the first active region;

making a determination that an amount of wear of the first active region exceeds a change threshold associated with the first storage module; and performing a modification of the first active region in response to the determination.

4. The method of claim 3, wherein the second storage module is associated with a second change threshold and wherein the second change threshold is different than the change threshold.

5. The method of claim 3, wherein the change threshold is P/E cycle value.

6. The method of claim 2, wherein the amount of wear associated with the second physical address and the amount of wear associated with the fourth physical address are substantially similar.

7. The method of claim 1, wherein the first storage module comprises solid state storage.

8. The method of claim 1, wherein the request specifies a replication level.

9. A system, comprising:
a storage array comprising a plurality of storage modules; and
a controller operatively connected to the storage array and configured to:
receive a request to write data;
in response to the request, mirror the data to the plurality of storage modules having mirrored write operations restricted to active regions by:
select a first physical address in a first active region in a first storage module of the plurality of storage modules, wherein the first active region comprises an address range less than a total address range of the first storage module;
select a second physical address in a second active region in a second storage module of the plurality of storage modules, wherein an amount of wear associated with the first active region is less than a first change threshold and an amount of wear associated with the second active region is greater than the first change threshold;
write a first copy of the data to the first physical address; and
write a second copy of the data to the second physical address,
wherein the first storage module and the second storage modules are solid state modules.

10. The system of claim 9, wherein the controller is further configured to:
modify the address range of the first active region to include a new address range that is different from the address range to obtain an updated first active region;
after obtaining the updated first active region:
receive a second request to write second data;
in response to the second request:
select a third physical address in the updated first active region;
select a fourth physical address in the second active region;
write a first copy of the second data to the third physical address; and
write a second copy of the second data to the fourth physical address.

11. The system of claim 10, wherein the controller is further configured to:
obtain an amount of wear of the first active region;

make a determination that an amount of wear of the first active region exceeds a change threshold associated with the first storage module; and
perform a modification of the first active region in response to the determination.

12. The system of claim 11, wherein the second storage module is associated with a second change threshold and wherein the second change threshold is different than the change threshold.

13. The system of claim 11, wherein the change threshold is P/E cycle value.

14. The system of claim 10, wherein the amount of wear associated with the second physical address and the amount of wear associated with the fourth physical address are substantially similar.

15. The system of claim 9, wherein the request specifies a replication level.

16. The system of claim 9, wherein at least one of the plurality of storage modules comprises at least one selected from a group consisting of NAND flash and write in-place persistent memory.

17. A non-transitory computer readable medium comprising instructions, which when executed by at least one processor perform a method, the method comprising:
receiving a request to write data;
in response to the request, mirroring the data to storage modules having mirrored write operations restricted to active regions by:
selecting a first physical address in a first active region in a first storage module of the storage modules, wherein the first active region comprises an address range less than a total address range of the first storage module;
selecting a second physical address in a second active region in a second storage module of the storage modules, wherein the second active region comprises an address range less than a total address range of the second storage module, wherein an amount of wear associated with the first active region is less than a first change threshold and an amount of wear associated with the second active region is greater than the first change threshold;
writing a first copy of the data to the first physical address; and
writing a second copy of the data to the second physical address,
wherein the first storage module and the second storage modules are solid state modules.

18. The non-transitory computer readable medium of claim 17, the method further comprising:
modifying the address range of the first active region to include a new address range that is different from the address range to obtain an updated first active region;
after obtaining the updated first active region:
receiving a second request to write second data;
in response to the second request:
selecting a third physical address in the updated first active region;
selecting a fourth physical address in the second active region;
writing a first copy of the second data to the third physical address; and
writing a second copy of the second data to the fourth physical address.

19. The non-transitory computer readable medium of claim 18, the method further comprising:
obtaining an amount of wear of the first active region;

making a determination that an amount of wear of the first active region exceeds a change threshold associated with the first storage module; and performing a modification of the first active region in response to the determination.

20. The non-transitory computer readable medium of claim 19, wherein the second storage module is associated with a second change threshold and wherein the second change threshold is different than the change threshold.

* * * * *

UNITED STATES PATENT AND TRADEMARK OFFICE
CERTIFICATE OF CORRECTION

| | |
|---|---|
| PATENT NO. | : 10,599,342 B2 |
| APPLICATION NO. | : 15/395441 |
| DATED | : March 24, 2020 |
| INVENTOR(S) | : Richard H. Van Gaasbeck |

Page 1 of 1

It is certified that error appears in the above-identified patent and that said Letters Patent is hereby corrected as shown below:

In the Claims

Column 9, Line 31, in Claim 9, the phrase "select a first" should read -- selecting a first --.
Column 9, Line 36, in Claim 9, the phrase "select a second" should read -- selecting a second --.
Column 9, Line 43, in Claim 9, the phrase "write a first" should read -- writing a first --.
Column 9, Line 45, in Claim 9, the phrase "write a second" should read -- writing a second --.
Column 10, Line 24, in Claim 17, the phrase "perform a method" should read -- performs a method --.

Signed and Sealed this
Second Day of June, 2020

Andrei Iancu
*Director of the United States Patent and Trademark Office*